United States Patent [19]
Ooki et al.

[11] 4,296,346
[45] Oct. 20, 1981

[54] BRUSH HOLDING APPARATUS FOR ROTARY ELECTRIC MACHINE

[75] Inventors: Norihiro Ooki, Katsuta; Shoji Motegi, Hitachi; Yasuyuki Wachi, Takahagi; Yoshio Takikawa, Hitachi; Norio Yamakawa, Ibaraki, all of Japan

[73] Assignees: Hitachi, Ltd.; Hitachi Chemical Co., Ltd., both of Tokyo, Japan

[21] Appl. No.: 95,951

[22] Filed: Nov. 20, 1979

[30] Foreign Application Priority Data

Nov. 29, 1978 [JP] Japan .................................. 53-146562

[51] Int. Cl.³ .......................................... H02K 13/00
[52] U.S. Cl. .................................... 310/242; 310/240; 310/241
[58] Field of Search .............................. 310/239-242, 310/244-247, 232

[56] References Cited

U.S. PATENT DOCUMENTS

| | | | |
|---|---|---|---|
| 1,465,709 | 8/1923 | Chandeysson | 310/239 |
| 3,075,110 | 1/1963 | Pepworth | 310/240 |
| 3,271,605 | 9/1966 | Drabik | 310/246 |
| 3,387,155 | 6/1968 | Krulls | 310/239 |
| 3,432,708 | 3/1969 | Bissett | 310/239 |
| 3,466,481 | 9/1969 | Sckerl | 310/239 |
| 3,710,478 | 1/1973 | Krulls | 310/239 |
| 3,968,391 | 7/1976 | Blank | 310/240 |
| 4,082,975 | 4/1978 | Azarov | 310/239 |

FOREIGN PATENT DOCUMENTS

49-42601 11/1974 Japan .................................. 310/239

*Primary Examiner*—R. Skudy
*Attorney, Agent, or Firm*—Craig and Antonelli

[57] ABSTRACT

A brush holding apparatus for a rotary electric machine permitting removal and replacement of brushes without stopping the rotation of the rotary electric machine comprises a brush holder which can be detached from a stationary unit, and a securing device for detachably securing the brush holder to the stationary unit. A manipulating lever is provided on the stationary unit to actuate the securing device. The brush holder can easily be mounted on or detached from the stationary unit by the manipulation of the manipulating lever for the purpose of removal and replacement of the brushes while the rotary electric machine is in operation.

9 Claims, 10 Drawing Figures

BRUSH HOLDING APPARATUS FOR ROTARY ELECTRIC MACHINE

This invention relates to improvements in the structure of apparatus for holding brushes in rotary electric machines, and more particularly to an improved brush holding apparatus which is so constructed as to permit removal and replacement of the brushes while the rotary electric machine is in operation.

In a rotary electric machine, for example, a turbine generator or a water-wheel generator, exciting power is generally supplied from its stator part to the rotor winding under rotation, In such a rotary electric machine, it is impossible to supply the exciting power to the rotor winding by simply mechanically connecting a power supply line thereto since the rotor is rotating relative to the stator. It is therefore a common practice that slip rings formed of an electrical conductor are provided in the rotary part or as part of the rotor, and brushes of carbon or a metal material softer than the material of the slip rings are disposed in the stator part to make sliding engagement with the rotating slip rings thereby establishing the desired electrical connection between the stator and the rotor.

In the rotary electric machine, a brush holder is generally employed to securely hold the brushes in the stator part. This brush holder has the function of preventing lateral displacement of the brushes as well as the function of preventing escapement of the brushes and is provided with pressure imparting means, for example, springs for ensuring satisfactory sliding engagement of the brushes with the rotating slip rings at a predetermined pressure.

This brush holder must be sufficiently securely fixed to the stator part so that the brushes held therein may not be subject to oscillations resulting from, for example, vibrations of the rotary electric machine and impingement of cooling gas flowing around the brush holder at a high speed. It is therefore a common practice that this brush holder is bolted or otherwise secured to the stator part or formed integrally with the stator part to be secured in position without making any oscillatory motion.

The brushes held within the brush holder, which is constructed and secured in position in the manner above described, are subject to wear or development of cracks in a relatively long period of time of machine operation, and in such a case, the brushes only are removed from within the brush holder while the brush holder is kept secured to the stator part. When the brushes are to be removed or replaced, the operation of the rotary electric machine is stopped from the viewpoint of the safety of the operator since the brushes as well as the brush holder iself are electrical conductive members. In other words, the brushes are removed and replaced after de-emergizing or disconnecting the rotary electric machine from the power system.

An electric motor used for driving a machine such as a machine tool or an industrial equipment can be stopped for the purpose of removal and replacement of its brushes as required, or the brushes can be removed from and replaced on the motor while the machine is not in operation. However, in the case of the aforementioned turbine generator or water-wheel generator of very large capacity continuously run for supplying the industrial and domestic power requirements, the de-energization of the large-capacity generator, each time the removal and replacement of the brushes is required, results not only in a very large industrial loss but also in a great inconvenience for the receivers of power supply. Thus, the rotary electric machine must not be stopped so frequently.

In view of such a demand, apparatus of this kind permitting removal and replacement of brushes without stopping the operation of such a rotary electric machine have been proposed, and some of them have already been put into practical use.

The removal or replacement of the brushes only without stopping the operation of the rotary electric machine is difficult in view of the fact that the pressure imparting members (which are generally in the form of springs as described hereinbefore) pressing the brushes against the slip ring are disposed on the head side of the brushes, that is, on the side of the path of removal or replacement of the brushes. Therefore, most of the proposed apparatus of this kind are generally constructed to remove the brushes together with the brush holder holding the brushes therein.

The brush holder adapted to be detached from the stator part while holding the brushes therein is provided with an insulated handle on its head portion. The provision of the handle on the brush holder is advantageous in that the safety of the operator is improved since the operator need not have access to the electrical conductive members as compared with the removal of the brushes by the hand of the operator. This arrangement is also advantageous in that the portability of the brushes is improved. On the other hand, the above arrangement will not be so sufficient from the viewpoint of fixed support because the brush holder is arranged to be detachable. More precisely, when the brush holder itself may be subject to oscillations as described hereinbefore, the brushes held therein will also be subject to oscillations, or so-called chattering will occur resulting in an undesirable reduction in the current conduction capability. To avoid this trouble, the brush holder itself must be secured to the stator part so as to be sufficiently free from oscillations. Although merely securing the brush holder itself in position in such a sufficiently oscillation-free relation may be easily achieved, it is very difficult to mount the brush holder in such a manner that the brush holder is easily detachable, and yet, it is reliably secured in position in the oscillation-free relation. Especially, in the case of the brush holder of this kind, such an additional condition must be satisfied that it can be detached without the use of a spanner, a wrench or a special tool since detachment of the brush holder with such a tool in the operating state of the rotary electric machine is very dangerous to the operator due to the possibility of contact with the electrical conductive members, that is, the possibility of an electrical shock to the operator. Such another condition must also be satisfied that the detachment and mounting of the brush holder must not be time-consuming and troublesome.

Thus, the brush holder of this kind must satisfy, on one hand, the condition that it can be detached and mounted in a simplest possible manner, and, on the other hand, the condition that it must be secured to be oscillation-free as much as possible, these two conditions being contradictory to each other.

Further, the arrangement permitting the removal of the brushes in the state held within the brush holder is encountered with such another problem in respect of the capability of conduction of current. That is, the brush holder is arranged to be disengageable from the electrical conductive members which are generally the bus rings in the stator part, and therefore, electrical engagement therebetween must also be taken into consideration. It is one of the major problems that how the operator can attain this electrical engagement or disengagement without touching his hand with the electrical conductive members including the bus rings, and the work required for this electrical engagement or disengagement must not be complex and time-consuming.

It will thus be seen that various difficult problems must be solved for the attainment of removal and replacement of the brushes while the rotary electric machine is in operation.

Known apparatus of this kind which are successful in relatively sufficiently satisfying these conditions and put into practical use at present will be described so that the improvements according to the present invention can more clearly be understood.

In one of the known apparatus, a wedge-shaped retaining member having an end portion tapered downward or toward the slip rings is mounted on the back face of a brush holder, and this wedge-shaped retaining member is fitted in wedge-shaped grooves formed in the stationary members. A handle provided on the brush holder is manipulated to actuate securing means disposed between the brush holder and the stationary members for forcedly securing the retaining member in position in the wedge-shaped grooves. The handle is formed of an insulating material, of course, and acts also as a means for carrying the brush holder. The wedge-shaped retaining member is thus press-fitted in the wedge-shaped grooves to establish a so-called tongue and groove joint therebetween so that its surfaces making pressure engagement with the associated surfaces of the grooves act to mechanically fixedly secure the brush holder in position and to electrically connect the brush holder to the stationary members. Such an apparatus is disclosed in, for example, U.S. Pat. No. 3,387,155.

A second one of the known apparatus of this kind will be briefly described. In this second apparatus, a member analogous to a clothespeg is mounted on a brush holder, and a portion of the stator part is clamped by this peg-like member, so that the brush holder can be mechanically secured in position and electrically connected to the stator part by the peg-like member. Such an apparatus is disclosed in, for example, U.S. Pat. No. 3,466,481 and Japanese Patent Publication No. 49-42601.

It is true that these known apparatus are effective in solving the problems pointed out above and are thus satisfactory to a considerable extent. However, with the recent trend toward a larger capacity of such a rotary electric machine and also with the increasing demand for ensuring the safety of the operators, such new problems arise as will be described below.

With the increase in the capacity of a modern rotary electric machine and also with the increase in the circumferential speed of the slip rings in the rotary electric machine, the supporting arrangement merely securing the brush holder in position by the wedge-shaped retaining member will become no more sufficient for restricting the brush holder from movement in the horizontal direction, that is, in the circumferential direction of the slip rings or the direction of sliding engagement of the brushes with the slip rings, and the brush holder will oscillate in that direction.

As is commonly known, the brushes held within the brush holder engage at their bottom surfaces with the surfaces of the slip rings to participate in the function of conduction of current. Therefore, if the brush holder holding the brushes therein were subject to oscillations, the brushes would also be subject to oscillations, resulting in undesirable chattering of the brushes thereby giving rise to an undesirable reduction in the current conduction capability. The oscillation motion of the brush holder is thus a very serious problem for the rotary electric machine.

Further, with the increase in the capacity of the modern rotary electric machine, the size of the brush holder itself tends to become correspondingly large. Thus, due to the corresponding increase in the current value handled by the brushes, the size and number of the brushes tend to increase more and more. Consequently, a single brush holder usually contains a plurality of, or four or five, brushes therein, and the weight of the brush holder itself becomes too heavy to be easily carried and mounted or detached. Further, the increase in the number of the brush holders will require a heavy labor for the removal and replacement of the brushes. The most serious fact among others is that the operator must remove and replace the brushes in a narrow space immediately in front of the rotor shaft and slip rings rotating at a high speed and in an environment in which tremendous vibrations and noises prevail, and he stands adjacent to the electrical conductive parts. The operator working in such an environment would exhaust his nerves to an unestimable extent.

It is therefore a primary object of the present invention to provide an improved and ideal brush holding apparatus of this kind which obviates the aforementioned problems including the problem of the facility of detachment and replacement of the brush holder, the problem of the oscillation-free support of the brush holder in the stator part and the problem of the satisfactory electrical engagement of the brush holder with the rotor part when mounted in position, and which ensures that the operator can detach and replace the brush holder safely and without anxiety, and also, the operator need not unnecessarily exhaust his nerves and need not make any heavy labor in that work.

Another object of the present invention is to provide an improved brush holding apparatus of the kind above described which is not complex in construction and minimizes undesirable oscillations of the brush holder even when incorporated in a high-speed rotary electric machine of large capacity.

The brush holding apparatus according to the present invention which attains the above objects comprises securing means for detachably securing a retaining member, which is fixedly mounted on a brush holder, to a stationary unit and a manipulating lever for manipulating the securing means, and this manipulating lever and part of the securing means are provided on the stationary unit. Further, in the brush holding apparatus of the present invention which attains the above objects, the securing means securing the retaining member to the stationary unit makes frictional securing engagement with the retaining member, that is, the securing means imparts the securing pressure to the retaining member, and at the same time, frictionally prevents the retaining member from movement in the direction orthogonal with respect to the imparted direction of the securing pressure, and a pair of radially extending slits are formed in the end of the retaining member radially opposite from the disposed position of the securing means, so that the brush holder assembled with the retaining member can be held in position by the combination of the resilient holding pressures imparted by the slits of the retaining member and the securing pressure imparted from the securing means making frictional securing engagement with the retaining member to prevent lateral movement of the assembly.

According to the present invention, there is provided a brush holding apparatus for a rotary electric machine comprising: a plurality of brushes disposed along the outer periphery of rotatable slip rings for making sliding engagement therewith; a brush holder holding the brushes while pressing the brushes against the outer periphery of the slip rings at a predetermined pressure, the brush holder being provided on its head with an insulated handle so that the brush holder can be carried by the operator who grips the handle; retaining means fixedly mounted on a portion of the brush holder and shaped in the form of a wedge having its transverse width gradually narrowed toward the slip rings; stationary means shaped to be engageable with the retaining means and spaced from the slip rings by a predetermined distance; securing means for detachably securing the retaining means to the stationary means; and a manipulating lever pivoted to the stationary means for actuating the securing means, the securing means being engaged with or disengaged from the retaining means in response to the manipulation of the manipulating lever whereby the brush holder can be mounted on or detached from the stationary means.

A preferred embodiment of the brush holding apparatus according to the present invention will be described with reference to the accompanying drawings, in which.

Figure 1:
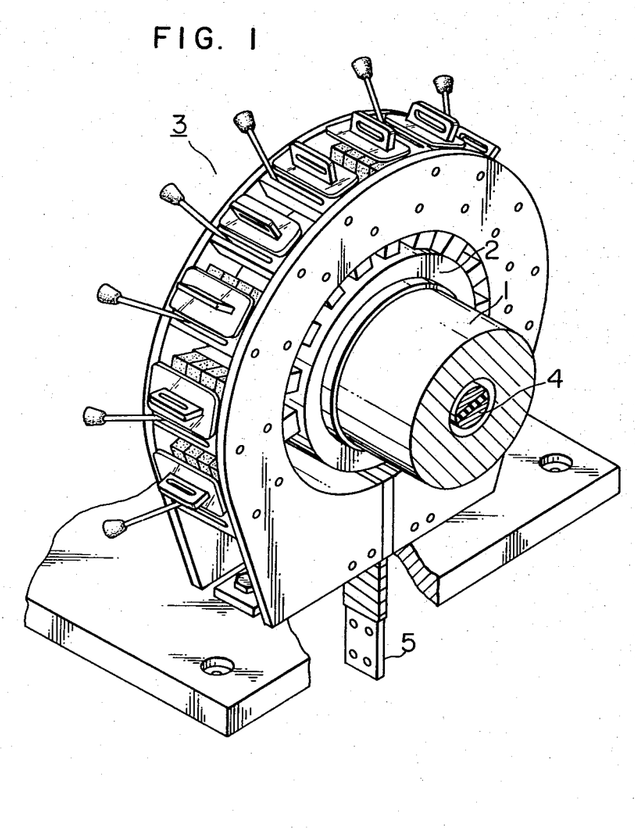
FIG. 1 is a partly cutaway, perspective view showing current collecting parts and associated parts of a rotary electric machine equipped with an embodiment of the brush holding apparatus according to the present invention.

Referring now to FIG. 1 showing, in a perspective fashion, a current collecting section and associated parts of a rotary electric machine to which the present invention is applied, the rotary electric machine includes a rotor shaft 1, slip rings 2 arranged for rotation together with the rotor shaft 1, and a brush holding apparatus 3 disposed around the slip rings 2. Although there are actually such two slip rings 2 of positive and negative polarities respectively, only one of them is shown in FIG. 1.

The slip rings 2 are formed of an electrical conductor and are electrically connected to rotor windings (not shown) through leads 4 disposed in an axial bore of the rotor shaft 1.

The brush holding apparatus 3 mounted on the stator part of the rotary electric machine includes a terminal plate 5 which is electrically connected to an exciter (not shown) by leads. The brush holding apparatus 3 functions thus to electrically connect the rotor windings to the exciter, and more particularly, it carries out the function of establishing electrical connections between the slip rings 2 which are under rotation and the stator part which is stationary.

Figure 2:
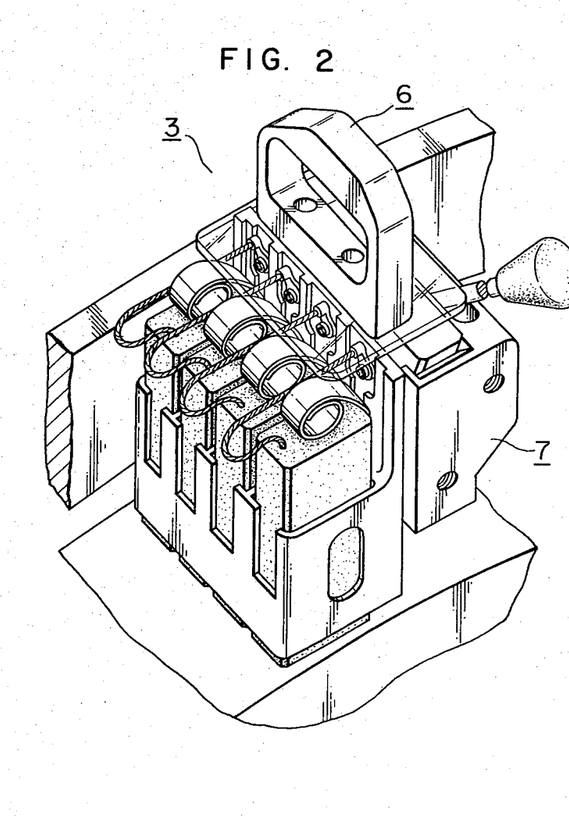
FIG. 2 is an enlarged perspective view of the brush holding apparatus shown in FIG. 1.
Figure 3:
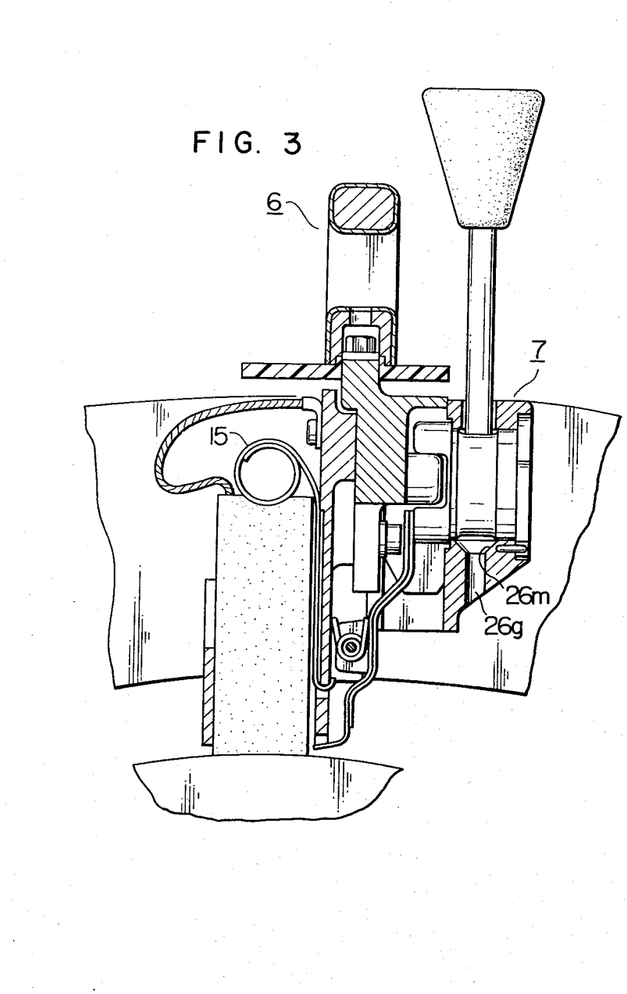
FIG. 3 is a vertical sectional, side elevation view of the brush holding apparatus shown in FIG. 2.

FIGS. 2 and 3 show various parts of the brush holding apparatus 3 in an enlarged fashion.

Figure 4:
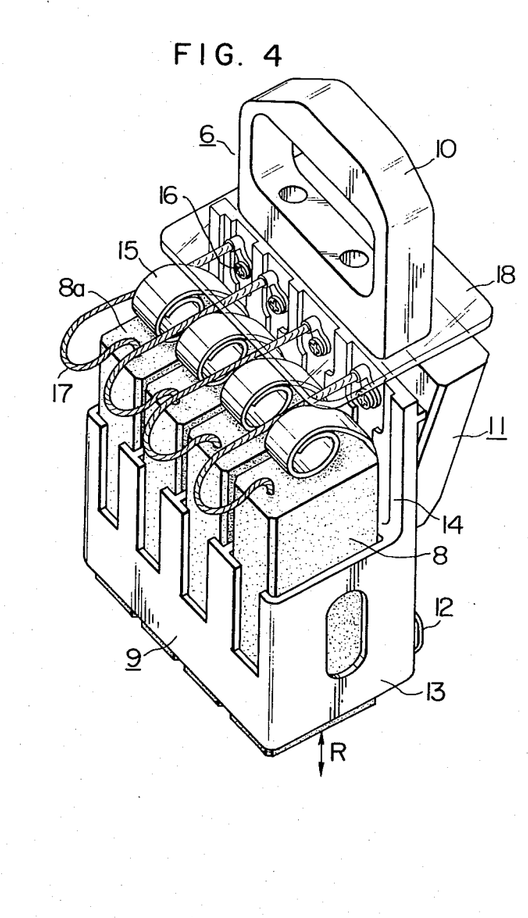
FIG. 4 is a perspective view similar to FIG. 2 to show the brush holding mechanism of the apparatus.
Figure 5:
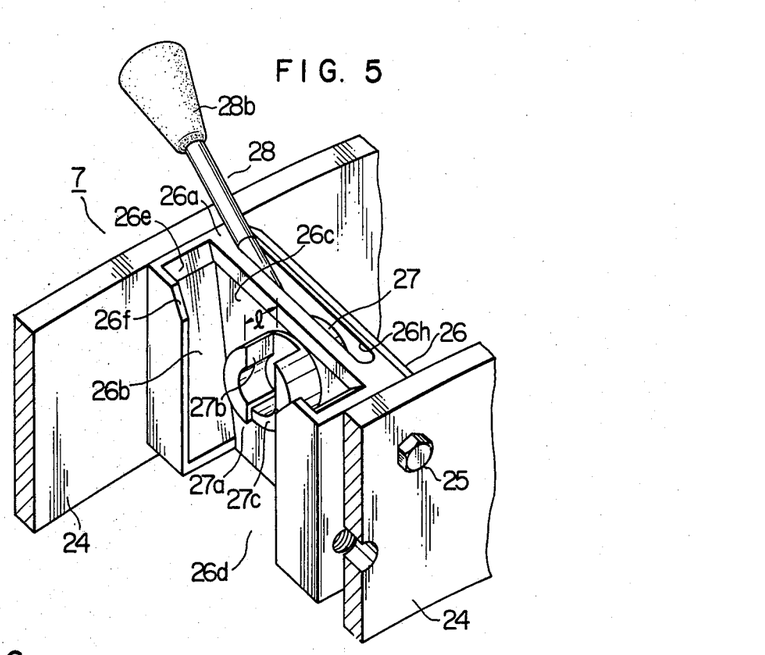
FIG. 5 is a partly sectional perspective view of part of the stationary unit.

The brush holding apparatus 3 is broadly divided into a brush holding mechanism 6 and a stationary unit 7. This stationary unit 7 is permanently fixed to the stator which is the stationary part of the rotary electric machine, while the brush holding mechanism 6 is arranged to be separated or detached from this stationary unit 7 as required. FIGS. 4 and 5 show the brush holding mechanism 6 and the stationary unit 7 respectively in the relatively separated or detached state.

Figure 8:
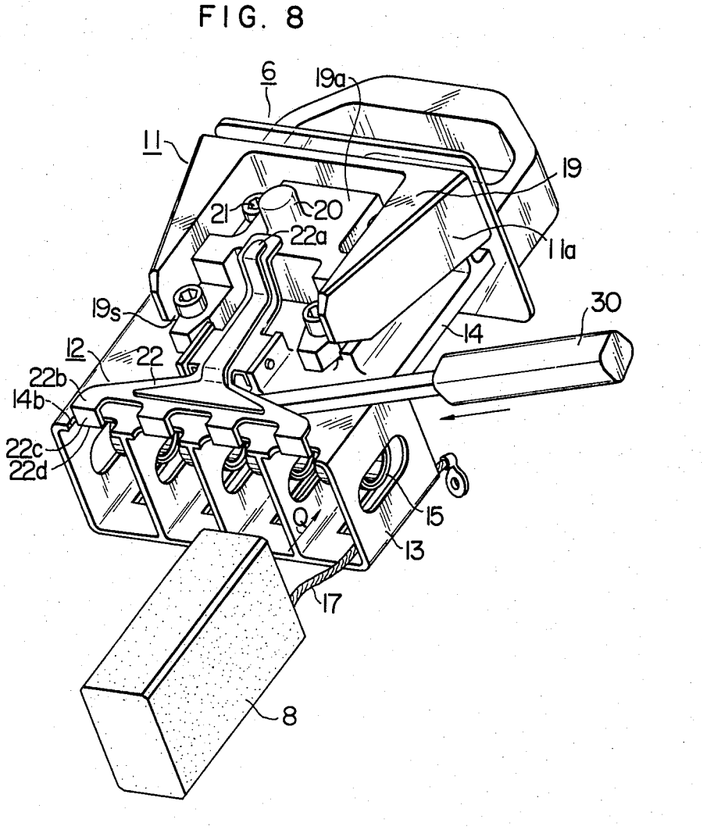
FIG. 8 is a perspective view of the brush holding mechanism together with a brush being inserted therein.

The structure of the brush holding mechanism 6 will firstly be described with reference to FIGS. 3, 4 and 8. Referring to FIGS. 4 and 8, the brush holding mechanism 6 comprises a plurality of brushes 8, a brush holder 9 holding these brushes 8 therein, a handle 10 gripped for carrying the brush holding mechanism 6, a retaining unit 11 for retaining the brush holding mechanism 6 on the stationary unit 7, and a brush locking unit 12 for locking the brushes 8 within the brush holder 9 during carrying the brush holding mechanism 6.

The brush holder 9 includes a plurality of brush boxes 13 each of which is adapted to hold one of the brushes 8 therein. Each brush box 13 is shaped in the form of a hollow square pillar which is so sized as to permit free movement of the brush 8 in the longitudinal direction or the direction shown by the arrow R in FIG. 4 but not to permit movement of the brush 8 in the lateral direction. One of the walls of each brush box 13 defines a portion of a main wall 14 extending in the longitudinal direction over a relatively long distance. Although FIG. 4 illustrates that a single brush holder 9 includes four brush boxes 13 by way of example, it is apparent that the number of these brush boxes 13 is determined depending on the capacity of the rotary electric machine. Generally, it is most usual that such a brush holder 9 includes three or four brush boxes 13 in a rotary electric machine of large capacity.

The brush holder 9 further includes a plurality of coil springs 15 each of which acts to press the associated brush 8 against the slip rings 2 at a predetermined pressure which is generally about 150 gr/cm$^2$. Each coil spring 15 is anchored at one end portion of the coil to a lower portion of the main wall 14 and is free at the other end, as best shown in FIG. 3. This free end of the coil spring 15 rests upon the top surface 8a of the associated brush 8 inserted into the brush box 13.

Threaded holes are bored in the upper portion of the main wall 14, and set screws 16 are threaded into these holes respectively to fix the terminals of pig tails 17 of the brushes 8, to the main wall 14 of the brush holder 9.

The aforementioned handle 10 is also mounted on the main wall 14. More precisely, the handle 10 extends from the top end of the main wall 14 in the same direction as the extending direction of the main wall 14 and is securely fixed to the main wall 14 directly or through the retaining unit 11. A protective plate 18 formed of an electrical insulator is disposed between the handle 10 and the main wall 14 as well as the retaining unit 11 so as to protect the operator from an electrical shock. Of course, the handle itself 10 is also formed of an electrical insulator. The protective insulator plate 18 shown in FIG. 4 is entirely formed of a transparent electrical insulator. This is effective in that the degree of wear and the state of operation of the brushes 8 can be readily inspected from the exterior. However, the protective plate 8 need not be formed of such an electrical insulator in its entirety and may be provided by applying an insulating surface coating on a metal plate. The same applies to the handle 10. The protective insulator plate 18 is advantageously as large in size as possible from the viewpoint of protection of the operator in both the electrical aspect and the mechanical aspect. The size and shape of this plate 18 are suitably selected taking the facility of detachment of the brush holding mechanism 6 into consideration too. In FIG. 4, the protective insulator plate 18 is illustrated to be rectangular in shape, because the plate 18 of this shape, when mounted in position, can fully cover the space between the adjacent brush holding mechanisms 6 and is thus advantageous for protecting the operator from an electric shock.

Referring to FIG. 8, which is a perspective back view of the brush holding mechanism 6, the retaining unit 11 for retaining the brush holding mechanism 6 on the stationary unit 7 shown in FIG. 5 is also mounted on the main wall 14 of the brush holder 9. The brush locking unit 12 for locking the brushes 8 within the brush boxes 13 during detachment and replacement of the brush holding mechanism 6 or during carrying the brush holding mechanism 6 by the hand of the operator is also mounted on the main wall 14 of the brush holder 9.

The retaining unit 11 includes a wedge-shaped retaining member 19 having a pair of tapered portions 11a converging toward the slip rings 2 or downward in FIG. 8, and a columnar retaining lug 20 projecting from an upper middle portion of the retaining member 19 in a direction orthogonal with respect to the plane of the main wall 14 of the brush holder 9. This retaining lug 20 forms part of securing means. The tapered portions 11a of the retaining member 19 make pressure engagement with mating tapered faces 26b of a holder receiving member 26 in the stationary unit 7 described later with reference to FIG. 5 and act to establish an electrical connection between the brush holding mechanism 6 and the stationary unit 7, while, at the same time act to mechanically retain the brush holding mechanism 6 on the stationary unit 7. Therefore, the surfaces of the tapered portions 11a of the retaining member 19 are finished to be completely flat and smooth so that the tapered portions 11a can make intimate engagement with the mating tapered faces 26b of the holder receiving member 26 in the stationary unit 7. As seen in FIG. 8, a recess 19a is formed in the upper middle portion of the retaining member 19, and the aforementioned retaining lug 20 is erected on the bottom wall of this recess 19a.

The retaining member 19 is so wedge-shaped that its transverse width is gradually narrowed toward the bottom of the brush holder 9 or toward the slip rings 2 as described hereinbefore, and a pair of spaced slits 19S extend from the lower end of the wedge-shaped retaining member 19 toward the upper end having the largest transverse width. The retaining lug 20 is integrally fixed to the wedge-shaped retaining member 19 at a position as described hereinbefore, and the selection of the position of this retaining lug 20 is very important for the reason which will be described later. It will be merely mentioned herein that the retaining lug 20 is located at an upper middle portion of the wedge-shaped retaining member 19 at a position radially opposite from the slits 19S.

A cam 27 described later with reference to FIG. 5 is engageable with the retaining lug 20, and one of its end portions is brought to the position adjacent to the retaining lug 20 when the brush holding mechanism 6 is mounted on the stationary unit 7. Therefore, a space capable of sufficiently receiving the lug-engaging cam 27 therein is formed or defined around the retaining lug 20 of the retaining member 19. For the purpose of defining such a space around the retaining lug 20, the wedge-shaped retaining member 19 is fixed to the main wall 14 of the brush holder 9 by bolts 21 received in countersinks or by bolts having a bolt head of special shaped.

Figure 7:
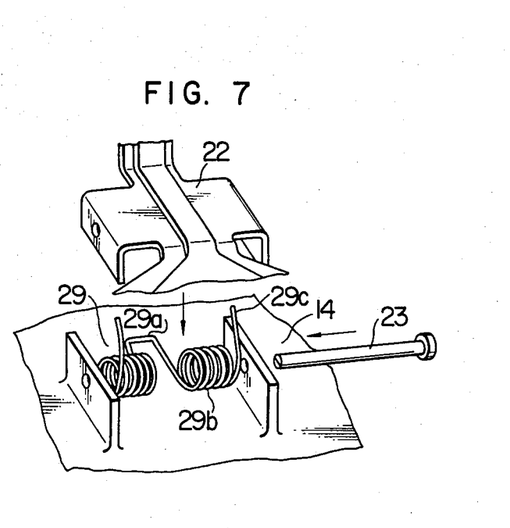
FIG. 7 is an exploded perspective view of the pivot connection between the brush locking unit and the brush holder.

The brush locking unit 12 is disposed on the main wall 14 of the brush holder 9 at a position closer toward the slip rings 2 than the retaining lug 20. Briefly, this brush locking unit 12 includes a swingable member 2 adapted for making seesaw motion thereby locking the brushes 8 in the brush boxes 13 by engaging therewith at their side face portions. More precisely, this swingable member 22 is disposed along the main wall 14 of the brush holder 9 to extend from a position adjacent to the lower end of the main wall 14 of the brush holder 9 to a position adjacent to the retaining lug 20 as shown in FIG. 8. The swingable member 2 is swingably supported at its approximately middle portion by a pivot pin 23 jounalled in a pair of spaced ridges 14a extending from the main wall 14 of the brush holder 9, as best shown in FIG. 7. Referring to FIG. 8 again, one end or upper end 22a of the swingable member 22 terminates very close to the retaining lug 20, and the other or lower end portion 22b thereof terminates adjacent to the lower end of the main wall 14 of the brush holder 9. In this case, the lower end portion 22b of the swingable member 22 is not simply located adjacent to the lower end of the main wall 14 of the brush holder 9, but it has a unique arrangement and a unique shape. It will be seen in FIG. 8 that this lower end portion 22b of the swingable member 22 is shaped into the form of a comb having the same number of teeth 22c as that of the brush boxes 13, and the end 22d of each comb tooth 22c is bent toward the associated brush box 13 to be capable of being inserted into an associated cutout 14b formed in the lower end of the main wall 14 of the brush holder 9. Although the brush locking unit 12 is described to be capable of making the motion like that of a seesaw mechanism, for conveniences of explanation, this seesaw mechanism is not freely movable in the present invention. More precisely, a torsion spring 29 as shown in FIG. 7 is mounted on the pivot pin 23 swingably supporting the swingable member 22 between the upstanding ridges 14a of the main wall 14 of the brush holder 9 so as to normally bias the ends 22d of the comb-shaped portion 22b of the swingable member 22 toward the associated brush boxes 13. As specifically shown in FIG. 7, this torsion spring 29 includes a generally U-shaped middle portion 29a and a pair of coil-like spring portions 29b extending in opposite directions from the U-shaped middle portion 29a, and each of the spring portions 29b has a linear tail end portion 29c. The torsion spring 29 is compressed between the opposite walls of the pivoted middle portion of the swingable member 22 with its linear tail end portions 29c bearing against the swingable member 22 and with its U-shaped middle portion 29a bearing against the main wall 14 of the brush holder 9.

The torsion spring 29 having such a shape and arrangement can operate with improved stability and is fully effective in preventing an unbalance in the position of the ends 22d of the comb-shaped portion 22b of the swingable member 22 relative to the associated brush boxes 13. Thus, when the ends 22d of the comb-shaped portion 22b of the swingable member 22 engage with the associated brushes 8 held in the brush boxes 13, any appreciable unbalance does not exist in the relative positions of the ends 22d of the comb-shaped portion 22b of the swingable member 22 so that a substantially uniform holding pressure can be effectively applied to the brushes 8.

The brush holding mechanism 6 having the aforementioned construction can be freely carried, while holding the brushes 8 within the brush holder 9, by the operator who grasps the handle 10.

The structure of the stationary unit 7, to which the brush holding mechanism 6 is secured by the securing means, will be described with reference to FIG. 5.

Referring to FIG. 5, the stationary unit 7 includes, as its principal parts, a pair of spaced bus rings 24 disposed above the associated slip rings 2 (FIG. 1) with a predetermined distance maintained therebetween, a plurality of holder receiving members 26 disposed between and fixed to the bus rings 24 by bolts 25, a plurality of lug-engaging cams 27 each disposed in a portion of the associated holder receiving member 26 and forming part of the securing means, and a plurality of manipulating levers 28 for actuating the associated cams 27.

The bus rings 24 are securely fixed to the stator part of the rotary electric machine to support the holder receiving members 26, and at the same time, to electrically connect the individual brush holders 9 to the terminal plates 5 shown in FIG. 1.

The holder receiving members 26 are spaced from each other by a predetermined distance in the circumferential direction of the bus rings 24. Each holder receiving member 26 is disposed adjacent to the associated brush holder 9 and is shaped in a manner as described presently.

Referring to FIG. 5, the holder receiving member 26 includes an upper face 26a remote from the slip rings 2, and a wedge-shaped groove 26c extending downward from the upper face 26a for receiving therein the associated retaining member 19 of the brush holding mechanism 6. This wedge-shaped groove 26c has a pair of confronting tapered faces 26b formed in the opposite side walls of the member 26 fixed to the bus rings 24, and the transverse width of this wedge-shaped groove 26c is gradually narrowed toward the slip rings 2 from the upper face 26a of the member 26. The wedge-shaped groove 26c has an opening 26d extending in the circumferential direction of the bus rings 24, and a pair of tapered portions 26e having an inclination at least less than that of the tapered faces 26b are formed between the upper extremities of the tapered faces 26b and the upper face 26a of the member 26. These tapered portions 26e act as an effective means for facilitating insertion of the wedge-shaped retaining member 19 into the wedge-shaped groove 26c of the member 2. Thus, even when the wedge-shaped retaining member 19 is inserted in a more or less displaced relation into the mating wedge-shaped groove 26c of the member 26, the tapered portions 26e act as a guide thereby facilitating insertion of the retaining member 19 into the mating groove 26c by the operator. For the same reason, chamfered portions 26f are provided in the upper area of the opening 26d of the wedge-shaped groove 26c.

The lug-engaging cam 27 for engaging with and locking the retaining lug 20 of the retaining member 19 of the brush holding mechanism 6 is shown mounted in a middle portion of a hollow intermediate wall of the holder receiving member 26. This lug-engaging cam 27 is generally in the form of a solid cylinder and extends through the intermediate wall of the holder receiving member 26 in the circumferential direction of the bus rings 24. The lug-engaging cam 27 is pivoted to the holder receiving member 26 so as to be freely rotatable around the pivot, or more accurately, so as to be capable of angular rotation through an angle enough to lock the retaining lug 20 against movement.

Figure 6:
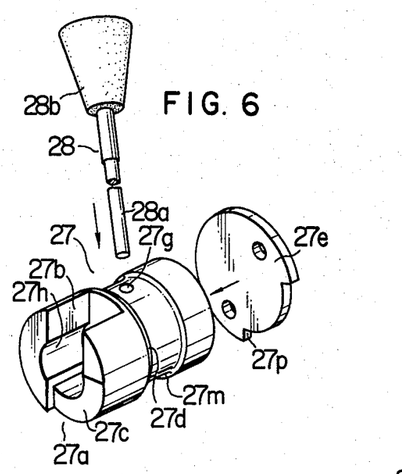
FIG. 6 is an exploded perspective view of the lug-engaging cam and the associated manipulating lever.

The structure of this lug-engaging cam 27 is shown in detail in FIG. 6. Referring to FIG. 6, the lug-ngaging cam 27 extending through the intermediate wall of the holder receiving member 26 protrudes at its one end portion 27a by a length l (FIG. 5) into the wedge-shaped groove 26c, and a locking groove 27b is formed in the protruding end portion 27a to open to the exterior through a portion of the peripheral face of and through the end face of the end portion 27a of the lug-engaging cam 27. The locking groove 27b is so sized as to permit free insertion therein of the retaining lug 20 of the retaining member 19 of the brush holding mechanism 6.

The end portion 27a of the cam 27 includes a tapered face 27c which functions to actuate the brush locking unit 12 in a manner as described later when the brush holding mechanism 6 is secured in position on the stationary unit 7. The lug-engaging cam 27 is formed at its peripheral face with a stepped portion 27d adjacent to the locking groove 27b, and a generally circular end plate 27e is fixed by bolts (not shown) to the other end of the cam 27 remote from the end portion 27a having the locking groove 27b formed therein, as shown in FIG. 6, so as to prevent dislocation of the cam 27 itself. More precisely, the stepped portion 27d and the end plate 27e engage with the corresponding flanges of the hollow intermediate wall of the holder receiving member 26 to prevent axial displacement of the lug-engaging cam 27. An arcuate cutout 27p is formed on a portion of the periphery of the end plate 27e. This arcuate cutout 27p determines the range of angular rotation of the lug-engaging cam 27 and is arranged to be engaged by a stopper (not shown) provided on the holder receiving member 26. The brush holding mechanism 6 is locked in position on the stationary unit 7 by the angular rotation of the lug-engaging cam 27 which is manipulated by the manipulating lever 28. This manipulating lever 28 is mechanically connected to the lug-engaging cam 27 in a tongue and groove fashion. To this end, a lever-receiving hole 27g is previously bored in the lug-engaging cam 27. The mating end portion 28a of the manipulating lever 28 is fitted in this lever-receiving hole 27g of the cam 27, and the other end portion of the lever 28 extends through the holder receiving member 26 (FIG. 5) outward or away from the slip rings 2. A grip 28b is mounted on the outwardly extending end of the lever 28 to facilitate manipulation of the lever 28. It is apparent that an electrical insulation similar to that of the protective insulator plate 18 (FIG. 4) is applied to this grip 28b to ensure the safety of the operator against an electrical shock. The reference numeral 26h in FIG. 5 designates a slot of elongated elliptical shape formed in the intermediate wall of the holder receiving member 26 to extend in a direction orthogonal with respect to the circumferential direction of the bus rings 24, and the end portion 28a of the manipulating lever 28 extends into this slot 26h. Thus, the manipulating lever 28 can make reciprocating movement within this slot 26h along the longitudinal direction of the slot 26h. The mechanically connection between the manipulating lever 2 and the lug-engaging cam 27 is preferably a loose tongue and groove joint so that the manipulating lever 28 can be disconnected from the cam 27 as required. In such a case, the peripheral edge of the opening of the lever-receiving hole 27g of the cam 27 is preferably shaped in the form of a bell mouth to permit easy insertion of the end 28a of the manipulating lever 28.

The brush holding mechanism 6 of aforementioned construction is mounted on and detached from the stationary unit 7 of aforementioned construction in a manner which will be described presently. The mounting process will be described first. Brushes 8 are inserted into the associated brush boxes 13 of the brush holder 9 as shown in FIG. 8. In FIG. 8, only one of such brushes 8 is shown to avoid confusion. Prior to the insertion of the brushes 8 into the brush boxes 13, the brush locking unit 12 is released, that is, the ends 22d of the comb-shaped portion 22b of the swingable member 22 are urged away from the brush boxes 13, and then, the brushes 8 are inserted from the lower ends of the brush boxes 13 in a direction as shown by the arrow R in FIG. 8 against the force of the coil springs 15. The brush locking unit 12 may be released and held in the released position by the fingers of the operator. However, it is desirable from the veiwpoints of the efficiency of insertion and the safety of the operator to previously prepare a tapered rod 30 and thrust the rod 30 between the swingable member 22 and the main wall 14 of the brush holder 9 as shown in FIG. 8.

After the brushes 8 have been completely inserted into the brush boxes 13, the brush locking unit 12 is restored to the brush locking position by removing the tapered rod 30. Consequently, the ends 22d of the comb-shaped portion 22b of the swingable member 22 engage with the end-adjacent side face portions of the brushes 8 to prevent escapement of the brushes 8 from the brush boxes 13.

Subsequently, the terminals of the pig tails 17 extending from the brushes 8 are securely fixed by the set screws 16 to the main wall 14 of the brush holder 9. This provides the assembly shown in FIG. 4.

The operator grips the handle 10 of the brush holding mechanism 6 assembled in the state shown in FIG. 4 and carries the brush holding mechanism 6 to the predetermined position of the current collector section of the rotary electric machine for mounting the brush holding mechanism 6 on the stationary unit 7 shown in FIG. 5. Prior to the mounting of the brush holding mechanism 6 on the stationary unit 7, the manipulating lever 28 is manipulated so that the locking groove 27b formed in the lug-engaging cam 27 in the stationary unit 7 is directed upward or in the fitting direction of the brush holding mechanism 6. (Generally, however, this locking groove 27b remains in that position after the detachment of the brush locking mechanism 6 from the stationary unit 7.) In mounting the brush holding mechanism 6 on the stationary unit 7, the operator must carefully direct the wedge-shaped retaining member 19 of the brush holding mechanism 6 toward the mating wedge-shaped groove 26c of the holder receiving member 26 to snugly fit the member 19 in the groove 26c. However, by virtue of the fact that the tapered portions 26e are formed on the peripheral edges of the wedge-shaped groove 26c as described hereinbefore, these tapered portions 26e act as a guide means for successfully fitting the member 19 in the groove 26c even when the member 19 is more or less inaccurately directed by the operator. Thus, the wedge-shaped retaining member 19 can be easily snugly fitted in the mating wedge-shaped groove 26c without exhausting the nerves of the operator in directing the member 19 toward and into the groove 26c.

After the wedge-shaped retaining member 19 has been completely fitted in the mating wedge-shaped groove 26c of the holder receiving member 26, the tapered faces 26b of the wedge-shaped groove 26c are in intimate contact with the mating tapered faces 11a of the retaining member 19, and also, the retaining lug 20 is engaged by the locking groove 27b of the lug-engaging cam 27. In that state of the assembly, the operator manipulates the manipulating lever 28 by the other hand, that is, the hand not gripping the handle 10. Due to the manipulation of the manipulating lever 28, the lug-engaging cam 27 is rotated through the angle corresponding to the angular movement of the manipulating lever 28, and the locking groove 27b of the lug-engaging cam 27 is now directed sideward from upward thereby locking the retaining lug 20 against escaping movement. At the same time, the side wall 27h of the locking groove 27b acts to press the retaining lug 20 downward or toward the slip rings 2. It will be apparent, therefore, that the side wall 27h of the locking groove 27b has a gentle slope suitable for pressing the retaining lug 20 downward or toward the slip rings 2 in the rotated position of the lug-engaging cam 27.

The brush holding mechanism 6 can be secured to the stationary unit 7 in the manner above described. It is to be noted that the wedge-shaped retaining member 19 is supported at the three vertices of a large triangle on the back face of the main wall 14 of the brush holder 9 and can thus strongly withstand lateral vibrations. This is due to the fact that each of the slits 19S formed in the wedge-shaped retaining member 19 provides an elastic force of reaction and that the lug-engaging cam 27 makes frictional engagement with the retaining lug 20.

Figure 9:
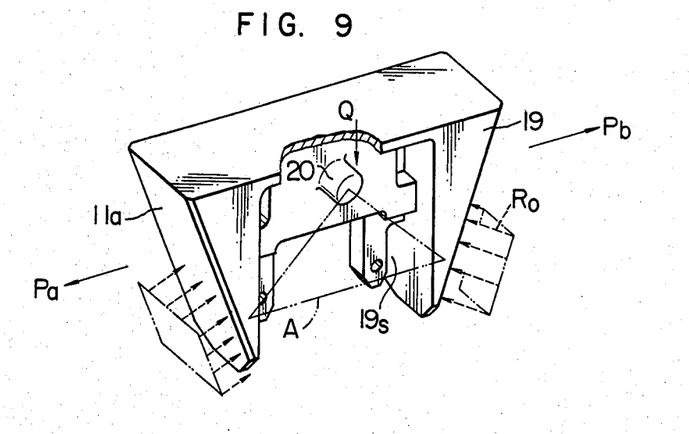
FIG. 9 is a perspective view of the wedge-shaped retaining member in the apparatus of the present invention.

The three-point support mode and the resistance against lateral vibrations will be described in detail with reference to FIG. 9. FIG. 9 shows, in a perspective fashion, only the wedge-shaped retaining member 19 supported by various forces as shown by the dotted arrows. In the supported state of this wedge-shaped retaining member 19, biasing forces as shown by the dotted arrows $R_o$ orthogonal with respect to the tapered faces 11a of the wedge-shaped retaining member 19 are imparted to such faces 11a opposite to the slits 19S due to the forces of reaction produced by the slits 19S. Further, a downward biasing force as shown by the dotted arrow Q is imparted to the retaining lug 20. These biasing forces provide a support mode supporting the wedge-shaped retaining member 19 at the three vertices of an imaginary triangle A as shown by the dotted lines, so that the wedge-shaped retaining member 19 can be stably supported in position. A more effective fact is that the wedge-shaped retaining member 19 is hardly movable in directions shown by the solid arrows Pa and Pb, and thus, undesirable oscillations of the brush holder 9 in the circumferential direction of the bus rings 24 can be substantially completely prevented, since the lug-engaging cam 27 in the stationary unit 7 makes frictional supporting engagement with the retaining lug 20 of the wedge-shaped retaining member 19.

Figure 10:
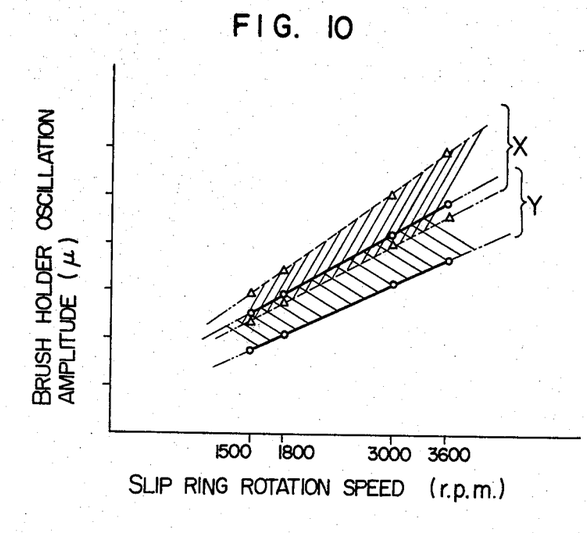
FIG. 10 is a graph showing the relation between the rotation speed of the rotary electric machine and the oscillatory movement of the brush holder.

FIG. 10 is a graph showing the results of comparison between the effect of securing the brush holder in the brush holding apparatus of the present invention and that in a prior art apparatus of this kind. More precisely, FIG. 10 shows the relation between the amplitude of oscillations in $\mu$ of the head portion of the brush holder in the direction of sliding engagement of the brushes with the slip rings and the rotation speed in rpm of the slip rings. The brush holders used in the test are of the type commonly employed in large-capacity rotary electric machines and can hold four brushes which are 25 mm $\times$ 40 mm wide and 100 mm long. The diameter of the slip rings is 350 mm.

The dotted curves X represent the oscillation stroke of the brush holder in the prior art apparatus, while the solid curves Y represent that of the brush holder in the apparatus of the present invention. These curves have a variation range since a variation in the brush current, that is, a variation in the generator output results in a corresponding variation in the dynamic characteristic of the brushes.

It will be seen in FIG. 10 that the values of the oscillation stroke at various rotation speeds in the case of the apparatus of the present invention are smaller by about 20% in average than those of the prior art apparatus, and thus, the apparatus of the present invention is greatly improved over the prior art apparatus, although the values of the oscillation stroke tend to increase with the increase in the rotation speed of the slip rings in all of the curves illustrated.

The process for securing the brush holding mechanism 6 to the stationary unit 7 and the effects of the support mode will be fully understood from the above description. It is to be noted that the manipulation of the manipulating lever 28 causes also actuation of the brush locking unit 12 in a manner which will be described presently. After the wedge-shaped retaining member 19 of the brush holding mechanism 6 has been fitted in the mating wedge-shaped groove 26c of the holder receiving member 26, but before the manipulating lever 28 is actuated, the locking groove 27b of the lug-engaging cam 27 remains directed upward, and the brush locking unit 12 remains in the position locking or holding the brushes 8 within the brush boxes 13. In other words, the upper end 22a (the end opposite to the end portion 27a of the lug-engaging cam 27) of the swingable member 22 of the brush locking unit 12 is not in engagement with the tapered face 27c at the end portion 27a of the cam 27, and the swingable member 22 remains in the same position as that before the brush holding mechanism 6 is mounted on the stationary unit 7.

Then, when the operator starts to manipulate the manipulating lever 28, the end 22a of the swingable member 22 starts to engage with the tapered face 27c formed on the end portion 27a of the lug-engaging cam 27. With the manipulation of the manipulating lever 28, this tapered face 27c urges the end 22a of the swingable member 22 to cause swinging movement of the swingable member 22 through a limited angle around the pivot pin 23 pivotally supporting the member 22 on the main wall 14 of the brush holder 9. Consequently, the ends 22d of the comb-shaped portion 22b of the swingable member 22 remote from the end 22a are disengaged from the side faces of the brushes 8 to release the brushes 8 from the locked position.

The above steps mount the brush holding mechanism 6 on the stationary unit 7 and electrically connect the stationary unit 7 to the slip rings 2. This state is shown in FIGS. 1 to 3.

Description will now be directed to the process for detachment of the brush holding mechanism 6 from the stationary unit 7. Briefly, this process is entirely reverse to the process for mounting the brush holding mechanism 6 on the stationary unit 7.

The brush holding mechanism 6 is detached from the stationary unit 7 in such a case as when the brushes 8 are subject to wear or damage, or when the brushes 8 or the brush holding mechanism 6 itself is to be inspected.

In the first step of this detaching process, the operator graps the handle 10 of the brush holding mechanism 6 by one of his hands and manipulates the manipulating lever 28 by the other hand. The manipulation of the manipulating lever 28 causes rotating movement of the lug-engaging cam 27 thereby releasing the engagement between the lug-engaging cam 27 and the retaining lug 20. Thus, the brush holding mechanism 6 is released from the secured position and is now ready to be detached from the stationary unit 7. Simultaneously with the release of the brush holding mechanism 6 from the secured position, that is, simultaneously with the rotating movement of the lug-engaging cam 27, the end 22a of the swingable member 22 kept in pressure engagement with the tapered face 27c of the lug-engaging cam 27 is released from the engaged position, and the comb teeth ends 22d of the swingable member 22 engage with and impart pressure to the lower side face portions of the brushes 8. The brushes 8 are thus frictionally retained or locked in position by the ends 22a of the swingable member 22 making pressure engagement therewith and by the walls of the brush boxes 13 opposite to the main wall 14 of the brush holder 9. When the operator pulls up the handle 10 in the above state, the brush holding mechanism 6 can be detached from the stationary unit 7 while holding the brushes 8 within the brush boxes 13 of the brush holder 9.

Since, in this case, the comb teeth ends 22d of the swingable member 22 of the brush locking unit 12 extend into the associated cutouts 14b formed in the lower end of the main wall 14 of the brush holder 9, each of these ends 22d engages with the associated brush 8 at a relatively high position of the corresponding side face of the brush 8. Thus, these ends 22d act to sufficiently satisfactorily hold the brushes 8 in the locked position by cooperation with the wall portions of the brush boxes 13 opposite to the main wall 14 of the brush holder 9. Further, the comb teeth ends 22d of the swingable member 22 of the brush locking unit 12 have the function of springs because of the comb shape so that substantially uniform holding pressures can be imparted to the four brushes 8 regardless of possible differences in the size of the brushes 8 due to wear.

It will be seen from the above description that, in the brush holding apparatus according to the present invention, the handle 10 is provided on each of the brush holding mechanisms 6, and the manipulating lever 28 for securing each of the brush holding mechanisms 6 to the stationary unit 7 is provided on the stationary unit 7. Therefore, the operator can manipulate the manipulating lever 28 for mounting or detaching the brush holding mechanism 6 on or from the stationary unit 7 by the hand different from the hand gripping or about to grip the handle 10 of the brush holding mechanism 6. The manipulation for mounting or detaching the brush holding mechanism 6 on or from the stationary unit 7 is thus greatly facilitated. In the case of the brush holding mechanisms 6 employed in the rotary electric machine of large capacity, for example, a turbine generator having a capacity of 800 MVA, each of the brush holding mechanisms 6 is usually designed to hold four brushes therein, and its weight is usually about 6 kg. Because of such a weight, the operator will feel very tired after he has carried the brush holding mechanism 6 and mounted the brush holding mechanism 6 in the predetermined position on the stationary unit 7. It will thus be a heavy labor if the operator carries the brush holding mechanism 6 by one of his hands and manipulates the manipulating lever 28 by the same hand for securing the brush holding mechanism 6 to the stationary unit 7. In this respect, the brush holding apparatus according to the present invention is advantageous in that the operator can freely manipulate the manipulating lever 28 by the other hand not carrying the brush holding mechanism 6 since the manipulating lever 28 is provided on the stationary unit 7. Further, due to the fact that the manipulating lever 28 manipulated for securing the brush holding mechanism 6 to the stationary unit 7 is provided on the stationary unit 7, the weight of the brush holding mechanism 6 is reduced by the amount corresponding to the weight of the lever 28, and the force required for carrying the brush holding mechanism 6 is correspondingly reduced.

The effects of improved portability of the brush holding mechanism 6 and improved facility of manipulation for securing the brush holding mechanism 6 to the stationary unit 7 seem to be very slight. However, these very slight improvements lead to a very great convenience for the operator who must handle the brush holding mechanism 6 in the area which is not wide and in the environment in which be encounters. vibrations, noises and dangers. As described hereinbefore, the operator must handle the brush holding mechanism 6 in the area where he sees immediately in front of him the rotor shaft rotating at a high speed of 50 revolutions per second in the case of, for example, the 50-cycle generator, and in the environment in which tremendous vibrations and noises prevail, and many electrical conductive parts including the brush holders and bus rings are present. The operator working in such an area and in such an environment exhausts his nerves to an unestimable extent. Further, the large-capacity rotary electric machine of this kind includes a large number of brushes, and the operator must repeat such work by the number of the brush holding mechanisms 6. Therefore, the improvements achieved by the present invention provide a very great convenience for the operator participating in the work of this kind.

In the apparatus according to the present invention, the manipulating lever 28 manipulated for securing the brush holding mechanism 6 to the stationary unit 7 is arranged to move in the axial direction of the rotary electric machine for attaining the purpose. Therefore, the manipulating lever 28 can be freely manipulated without being interfered by the adjacent ones of the brush holders 9 arranged in side-by-side relation in the circumferential direction of the rotary electric machine, that is, without being moved toward the adjacent brush holders 9, so that the manipulating lever 28 can be easily manipulated. By virtue of the above arrangement of the manipulating lever 28, the circumferential interval between the adjacent brush holders 9 need not be especially taken into consideration in the design of the brush holding apparatus, and the interval can be selected relatively freely.

In the brush holding apparatus according to the present invention, the brush holding mechanism 6 is detachably secured to the stationary unit 7 by the action of the securing means including the lug-engaging cam 27, retaining lug 20 and manipulating lever 28. This arrangement provides such an additional advantage that the lug-engaging cam 27 actuated by the manipulating lever 28 can be rotated to the desired position utilizing the principle of the lever, and the operator need not make so much effort in that operation. Especially, due to the fact that the resilient end portion 27a of the lug-engaging cam 27 protrudes outward from the wall face of the intermediate wall of the holder receiving member 26 and includes the locking groove 27b engageable with the retaining lug 20 of the retaining member 19 in the brush holder 9, this end portion 27a of the lug-engaging cam 27, when engaged at the locking groove 27b with the retaining lug 20, deflects to produce the spring action so that a large securing force can be obtained without the provision of a special spring used for increasing the force for securing the brush holding mechanism 6 to the stationary unit 7. In a conventional mechanism, it is a common practice to interpose a compression spring between two parts so as to produce a large resilient force of reaction between these two parts. For the purpose of interposing the compression spring between these two parts, a special tool is used or a special device is prepared to place the compression spring between the two parts against the reaction force of the spring. In the apparatus of the present invention in which the end portion 27a of the lug-engaging cam 27 makes locking engagement at its locking groove 27b with the retaining lug 20 for the retaining member 19, it is merely required to successively assemble the individual parts, and thus, this section of the apparatus can be very easily assembled.

The lug-engaging cam 27 includes the stepped portion 27d which is machined to the shape conforming with the thickness of the flange defining the inner wall of the wedge-shaped groove 26c of the holder receiving member 26. Therefore, when the end 22a of the swingable member 22 of the brush locking unit 12 is engaged by the tapered face 27c of the lug-engaging cam 27, the reaction force is fully received by this flange thereby ensuring the reliable operation of the brush locking unit 12.

It will be seen in FIG. 6 which is the perspective view of the lug-engaging cam 27 and manipulating lever 28, the lug-engaging cam 27 is formed with a peripheral groove 27m at substantially the middle portion of its length and at a position opposite to the slot 26h of the holder receiving member 26 having the end portion 28a of the manipulating lever 28 extending therein. It will be seen in FIG. 3 which is the sectional view of the brush holding apparatus, a hole 26g extends radially through the lower portion of the holder receiving member 26 at a position opposite to the peripheral groove 27m formed on the lug-engaging cam 27. The provision of the groove 27m and hole 26g is effective in further improving the maintainability and reliability of the brush holding apparatus, as will be described presently. It is commonly known that, in the brush holding apparatus of this kind, the soft brushes 8 make sliding engagement with the rotating slip rings 2, and as a result, powders of the brush material removed due to wear accumulate on the adjacent parts. Deposition of the powders of the removed brush material on the rotatable lug-engaging cam 27 by way of the lever-receiving slot 26h of the holder receiving member 26 may obstruct the free rotation of the cam 27 thereby increasing the force required for manipulating the manipulating lever 28 or may impart damage to the engaging portions of the lug-engaging cam 27. The combination of the peripheral groove 27m of the cam 27 and the radial through-hole 26g of the member 26 obviates such a trouble. That is, the removed brush material in powder form entering the slot 26h is entrained on the stream of cooling air to travel around the peripheral groove 27m of the lug-engaging cam 27 to be finally discharged to the exterior through the radial through-hole 26g provided in the holder receiving member 26. Therefore, the removed brush material in powder form does not stay on the engaging portions of the lug-engaging cam 27 thereby preventing the aforementioned trouble and damage. This through-hole 26g may be provided in a plurality of numbers instead of only one, and it will be more satisfactory that this hole 26g extends through the holder receiving member 26 in a direction which is most suitable for the discharge of the powders of the removed brush material depending on the position of the brush holder 9. Further, the powders of the removed brush material can be discharged satisfactorily when the relation between the radial hole 26g, the peripheral groove 27m and the slot 26h is selected so that the axial width of the peripheral groove 27m is slightly larger than the axial width of the slot 26h, and the diameter of the hole 26g is larger than the axial width of the peripheral groove 27m. The above relation facilitates the desired full discharge of the powders of the removed brush material from the space between the lug-engaging cam 27 and the holder receiving member 26. In the embodiment of the present invention, the hole 26g is counterbored at the portion 26m opposite to the peripheral groove 27m as shown in FIG. 3 so as to exhibit the effect similar to that provided by the hole 26g of large diameter.

It will be understood from the foregoing detailed description of the brush holding apparatus according to the present invention that the securing means for detachably securing the wedge-shaped retaining member, which is fixedly mounted on the brush holder, to the stationary unit makes frictional securing engagement with the retaining member, that is, the securing means imparts the securing pressure to the retaining member, and at the same time, frictionally prevents the retaining member from movement in the direction orthogonal with respect to the imparted direction of the securing pressure, and the radially extending slits are formed in the end of the retaining member radially opposite from the disposed position of the securing means, so that the brush holder assembed with the retaining member can be held in position by the combination of the resilient holding pressures imparted by the slits of the retaining member and the securing pressure imparted from the securing means making frictional securing engagement with the retaining member to prevent lateral movement of the assembly. Therefore, the brush holder can by stably supported by a three-point support system and can also be strongly supported by the securing means against oscillations in the lateral direction, that is, in the direction of sliding engagement of the brushes with the rotating slip rings, so that undesirable lateral oscillations of the brush holder can be minimized in spite of the fact that the rotary electric machine has a large capacity and rotates at a high speed.

Further, the securing means for detachably securing the brush holder to the stationary unit includes the manipulating lever for manipulating the securing means, and this manipulating lever and part of the securing means are provided on the stationary unit. Therefore, the operator can manipulate the manipulating lever for securing the brush holder to the stationary unit by the hand different from the hand used for gripping the handle for carrying the brush holding mechanism including the brush holder and its accessory parts, so that the operation for mounting or detaching the brush holding mechanism on or from the stationary unit is greatly facilitate. Further, due to the fact that the manipulating lever and the part of the securing means actuated for detachably mounting the brush holding mechanism on the stationary unit are not provided on the brush holding mechanism to be carried by the hand of the operator, the weight of the brush holding mechanism is correspondingly reduced to improve the portability thereof. Therefore, even when the brush holder holds a large number of brushes therein, the brush holding mechanism can be easily mounted on and detached from the stationary unit, and the brushes can be removed and replaced without the heavy labor required hitherto for this purpose.

What we claim is:

1. A brush holding apparatus for a rotary electric machine comprising:

a plurality of brushes disposed along the outer periphery of rotatable slip rings for making sliding engagement therewith;

a brush holder holding said brushes while pressing said brushes against the outer periphery of said slip rings at a predetermined pressure, said brush holder being provided on its head with an insulated handle;

retaining means fixedly mounted on a portion of said brush holder and shaped in the form of a wedge having its transverse width gradually narrowed toward said slip rings;

stationary means shaped to be engageable with said retaining means and spaced from said slip rings by a predetermined distance;

securing means for detachably securing said retaining means to said stationary means, said securing means including a retaining lug protruding from and fixed to a portion of said brush holder, and a lug-engaging cam supported in said stationary means so as to be engageable with said retaining lug; and a manipulating lever pivotally coupled at one end thereof to a portion of said lug-engaging cam to cause angular rotation of said cam around its axis, said securing means being engaged with or disengaged from said retaining means in response to the manipulation of said manipulating lever whereby said brush holder can be mounted on or detached from said stationary means.

2. A brush holding apparatus for a rotary electric machine comprising:

a plurality of brushes disposed along the outer periphery of rotatable slip rings for making sliding engagement therewith;

a brush holder holding said brushes while pressing said brushes against the outer periphery of said slip rings at a predetermined pressure, said brush holder being provided on its head with an insulated handle;

retaining means fixedly mounted on a portion of said brush holder and shaped in the form of a wedge having its transverse width gradually narrowed toward said slip rings;

stationary means shaped to be engageable with said retaining means and spaced from said slip rings by a predetermined distance;

securing means for detachably securing said retaining means to said stationary means, said securing means including a retaining lug protruding from and fixed to a portion of said brush holder, and a lug-engaging cam supported in said stationary means so as to be engageable with said retaining lug;

brush locking means swingably mounted on a portion of said brush holder, said brush locking means being in the form of a seesaw mechanism adapted to make pressure engagement at one end thereof with said lug-engaging cam for interlocking movement therewith and to make pressure engagement at the other end thereof with the portion adjacent to the bottom of said brushes; and a manipulating lever pivotally coupled at one end thereof to a portion of said lug-engaging cam to cause angular rotation of said cam around its axis, said securing means being engaged with or disengaged from said retaining means in response to the manipulation of said manipulating lever whereby said brush holder can be mounted on or detached from said stationary means.

3. A brush holding apparatus as claimed in claim 2, wherein said retaining lug protrudes on the back side of said brush holder, and said lug-engaging cam engageable with said retaining lug is in the form of a solid cylindrical element which extends in the same direction as the extending direction of said retaining lug and is formed at one end thereof with a tapered face which is adapted to make pressure engagement with said one end of said brush locking means.

4. A brush holding apparatus as claimed in claim 3, wherein a reduced-diameter stepped portion is formed in the longitudinally intermediate area of and adjacent to said lever-coupled portion of said cylindrical element constituting said lug-engaging cam, so that said stepped portion is engageable with a flange of said stationary means on the disposed side of said brush holder.

5. A brush holding apparatus as claimed in claim 3, wherein said brush locking means includes a pair of ridges extending from the main wall of said brush holder, a pivot pin fixedly journalled in said ridges, a swingable member swingably supported on said pivot pin, and a torsion spring mounted on said pivot pin between said ridges for normally biasing said swingable member in one direction.

6. A brush holding apparatus as claimed in claim 5, wherein said torsion spring includes a generally U-shaped middle portion and a pair of coil spring portions extending from the opposite ends of said U-shaped middle portion to terminate in linear tail end portions respectively, and said tail end portions engage with said swingable member, while said U-shaped middle portion engages with the main wall of said brush holder.

7. A brush holding apparatus for a rotary electric machine comprising:

a plurality of brushes disposed along the outer periphery of rotatable slip rings for making sliding engagement therewith;

a brush holder holding said brushes while pressing said brushes against the outer periphery of said slip rings at a predetermined pressure, said brush holder being provided on its head with an insulated handle;

retaining means fixedly mounted on a portion of said brush holder and shaped in the form of a wedge having its transverse width gradually narrowed toward said slip rings, said retaining means being formed in one of the ends of the wedge with a pair of slits extending in the extending direction of the wedge;

stationary means shaped to be engageable with said retaining means and spaced from said slip rings by a predetermined distance;

securing means disposed between said stationary means and said retaining means for detachably securing said retaining means to said stationary means, said securing means including a retaining lug protruding from a portion of said retaining means in a relation displaced from said slits in the extending direction of the wedge, and a lug-engaging cam supported in said stationary means so as to be frictionally engageable with said retaining lug; and a manipulating lever pivotally coupled at one end thereof to a portion of said lug-engaging cam to cause angular rotation of said cam around its axis, said securing means being engaged with or disengaged from said retaining means in response to the manipulation of said manipulating lever whereby said brush holder can be mounted on or detached from said stationary means.

8. A brush holding apparatus as claimed in claim 7, wherein said retaining lug is located in the vicinity of the end of said retaining means remote from the other end nearer to said slip rings, and said slits are located in the other end of said retaining means nearer to said slip rings.

9. A brush holding apparatus for a rotary electric machine comprising:

a plurality of brushes disposed along the outer periphery of rotatable slip rings for making sliding engagement therewith;

a brush holder including a plurality of brush boxes formed on a portion of its main wall, and a plurality of springs disposed on a portion of its main wall for securely holding said brushes within said brush boxes respectively and pressing said brushes against the outer periphery of said slip rings at a predetermined pressure, said brush holder being provided on its head with an insulated handle;

retaining means fixedly mounted on a portion of the main wall of said brush holder on the side opposite from the disposed side of said brush boxes, said retaining means being shaped in the form of a wedge having its transverse width gradually narrowed toward said slip rings and being formed in the end of the wedge nearer to said slip rings with a pair of slits extending in the extending direction of the wedge;

stationary means including a wedge-shaped groove conforming with the wedge shape of said retaining means for receiving said retaining means in said groove, said stationary means being spaced from said slip rings by a predetermined distance;

securing means for locking said retaining means to said stationary means when said retaining means is received in said groove of said stationary means, said securing means including a retaining lug protruding from a portion of said retaining means in a direction orthogonal with respect to the plane of the main wall of said brush holder and in a relation displaced from said slits in the extending direction of the wedge, and a lug-engaging cam rotatably supported in said stationary means so as to be frictionally engageable with said retaining lug; and a manipulating lever pivotally coupled at one end thereof to a portion of said lug-engaging cam to cause angular rotation of said cam around its axis, said securing means being engaged with or disengaged from said retaining means in response to the manipulation of said manipulating lever whereby said brush holder can be mounted on or detached from said stationary means.

* * * * *